E. F. W. ALEXANDERSON.
ALTERNATING CURRENT COMMUTATOR MOTOR.
APPLICATION FILED SEPT. 11, 1914.

1,194,923.

Patented Aug. 15, 1916.
2 SHEETS—SHEET 1.

WITNESSES:
Marcus L. Byng
J. Ellis Glen

INVENTOR:
Ernst F. W. Alexanderson,
BY Albert G. Davis
HIS ATTORNEY.

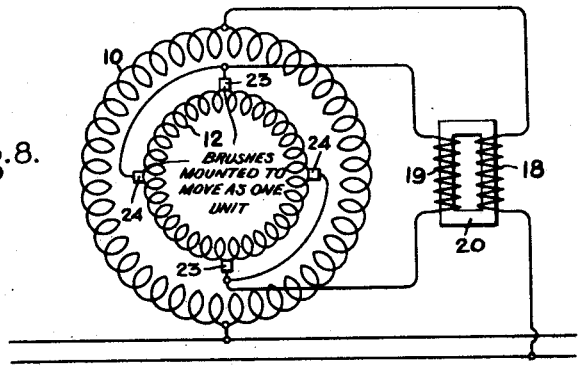
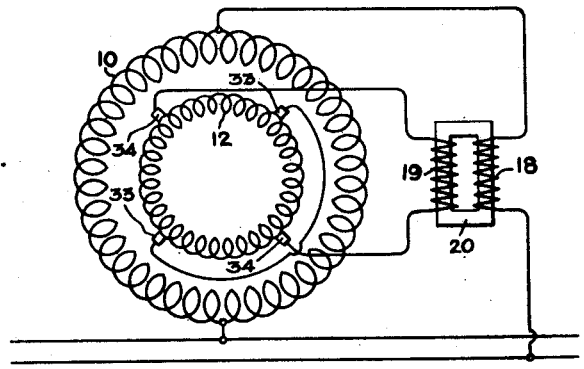
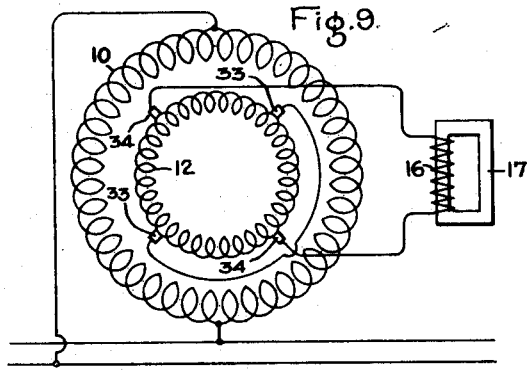
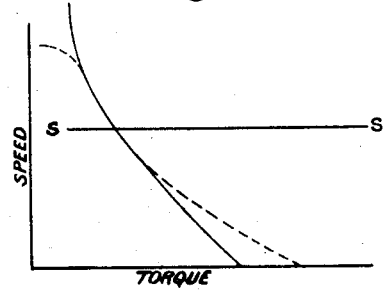

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT COMMUTATOR-MOTOR.

1,194,923.

Specification of Letters Patent. Patented Aug. 15, 1916.

Application filed September 11, 1914. Serial No. 861,291.

*To all whom it may concern:*

Be it known that I, ERNST F. W. ALEXANDERSON, a citizen of the United States, residing at Schenectady, county of Schenectady, State of New York, have invented certain new and useful Improvements in Alternating-Current Commutator-Motors, of which the following is a specification.

My invention relates to alternating current commutator motors, and more particularly to single phase alternating current motors having a commuted rotor winding of the direct current type and brushes arranged to provide a locally closed path for the current flowing in the commuted winding.

The object of my invention is to provide means for imparting to a single phase alternating current commutator motor of the repulsion motor type a particularly desirable speed torque characteristic.

A further object of my invention is to provide means for improving the starting torque of alternating current commutator motors of the type to which my invention relates.

Again, the object of my invention is to provide means for modifying in a desired manner the speed torque characteristic of an alternating current commutator motor of the repulsion motor type so that the torque of the motor at low speeds may be increased, or so that the light load speeds of the motor may be limited.

More especially the object of my invention is to improve the speed-torque characteristics of the well known forms of repulsion motors having for each pair of poles two sets, or an equivalent thereof, of short-circuited brushes.

Figure 1:
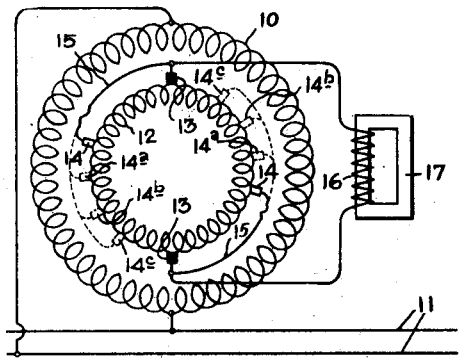
Figure 2:
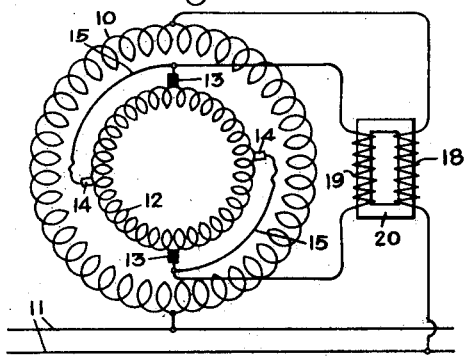
Figure 3:
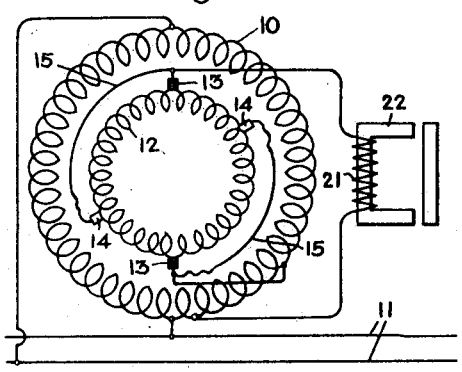

The features of my invention which I believe to be patentably novel are definitely indicated in the claims appended hereto. The principle and mode of operation thereof and its application to alternating current motors of the repulsion motor type will be understood from the following description taken in connection with the accompanying drawings, in which;

Figures 1, 2 and 3 are diagrammatic views of my invention applied to one particular form of repulsion motor; Figs. 8, 9 and 10 are diagrammatic views of my invention applied to other forms of repulsion motor, and Figs. 4, 5, 6, 7 and 11 are explanatory diagrams.

The aim of my present invention is to provide reliable and simple means for automatically modifying the speed torque characteristics of an alternating current motor of the repulsion motor type. My invention is more particularly concerned with motors of the repulsion motor type in which the brushes are shifted to vary the speed of the motor, and in such a motor I aim by my present invention to suitably modify the speed torque characteristics when the brushes are in their low speed positions, and particularly to increase the starting torque for these brush positions and to limit the light load speed of the motor. By the application of my invention to such a motor, the speed torque characteristic of the motor is modified only at abnormal speeds, as when the motor is starting or at relatively high light-load speeds, while at all normal running speeds the speed torque characteristic of the motor is not substantially altered. As is well understood, the repulsion motor comprises an inducing winding and an induced winding with a principal or main short-circuit about the induced winding along an axis at an angle to the inducing or working axis. In accordance with my present invention, I provide an auxiliary local circuit for the induced winding along an axis at right angles to the axis of the principal short-circuit, and I include in this auxiliary local circuit an inductive winding having a magnetic circuit designed to become magnetically saturated at a predetermined voltage.

My invention will be better understood by a brief consideration of certain forms of repulsion motors embodying the same.

The motor diagrammatically represented in Figs. 1, 2 and 3 of the drawings is a well known form of alternating current motor of the repulsion motor type, having two sets of relatively movable short-circuited brushes associated with the rotor or armature member. An inducing winding 10 is arranged on the stator member of the motor and is adapted to be connected to a single phase source of alternating current 11. The rotor member of the motor carries an induced or armature winding 12. The induced winding is a commuted winding of the direct current type, and is, accordingly, appropriately connected to the segments of a commutator upon which are operatively positioned the commutator brushes. The commutator brushes are divided into two sets, each set comprising a stationary and a movable brush. The stationary brushes are located in the magnetizing axis of the inducing winding, while the movable brushes are arranged along an axis at an angle to the axis of magnetization of the inducing winding. In Figs. 1, 2 and 3 of the drawings, I have illustrated a bi-polar motor and, accordingly, there are two stationary brushes 13 positioned in the magnetizing axis of the inducing winding 10. Each stationary brush has a coöperating movable brush 14 connected thereto by a short-circuiting conductor 15. As is well understood in the art, the brushes 14 are moved to obtain the desired speed regulation of the motor, the movement of the brushes 14 being such that they are always maintained (in a two-pole design) diametrically opposite to one another. Four positions of the movable brushes are indicated in Fig. 1 of the drawings. The brush position 14 is a low speed brush position, and the brush position $14^c$ is a high speed brush position, while brush positions $14^a$ and $14^b$ are intermediate stages. In all of the figures of the accompanying drawings I have represented stationary brushes by shading lines, while movable brushes are unshaded.

The principle of operation and the characteristics of the motor described in the preceding paragraph are well known. The purpose and mode of operation of my present invention will, however, be more clearly understood after a brief discussion of certain general characteristics of repulsion motors. In motors of the repulsion motor type, a current flowing in the inducing winding induces by transformer action a current in the induced winding. The induced winding is closed through the principle or main short-circuit in such a manner that the axis of magnetization of the induced winding with respect to this short-circuit is at an angle to the axis of magnetization of the inducing winding, hereinafter called the inducing or working axis. The magnetization produced by the induced winding may be resolved into two components, one in line with the inducing axis and the other at right angles thereto. The latter component represents the torque-producing field of the motor and may be produced by the inducing winding alone or by the inducing and induced winding together. The component of the induced winding magnetization in line with the inducing axis represents the energy or working current of the motor. It will be evident that if the axis of magnetization of the induced winding with respect to the principal short-circuit is coincident with the inducing axis, the motor has no torque producing field, and also that as this axis of magnetization of the induced winding moves away from the inducing axis, the torque-producing field increases while the energy current decreases, until these two axes are at right angles to each other, when the torque-producing field of the motor is a maximum and the energy current is a minimum or substantially zero. The strength of the torque-producing field is thus determined by the angle between the inducing axis and the axis of magnetization of the induced winding with respect to the principal short-circuit about the latter.

Shifting the brushes connected to the principal short-circuit of a motor of the repulsion motor type shifts the axis of magnetization of the induced winding and varies the torque-producing field of the motor, thereby changing the speed of the motor. When the torque-producing field is of small strength the speed will be high, while when this field is of large strength the speed will be low. When the brushes are in their low speed positions, the motor field strength is thus large, and as a result the inducing winding has considerable reactance, which chokes the flow of current therethrough and limits the energy current of the motor. If the induced winding is closed through an auxiliary local circuit along an axis at right angles to the axis of the principal short-circuit, a current path is provided for a current whose magnetizing effect is to modify the torque-producing field of the motor. The auxiliary local short-circuit has two effects; first, it alters the field strength of the motor, and, second, it alters the reactance of the inducing winding, due to the change in the field strength, and thereby modifies the energy current of the motor. When the brushes of the principal short-circuit occupy their low-speed positions, the auxiliary local short-circuit operates at low speeds, first, to decrease the strength of the torque-producing field of the motor, and, second, to reduce the reactance of the inducing winding and to permit the flow of an increased energy current. The voltage between those points of the induced winding to which the auxiliary short-circuit is electrically connected is a function of the speed of the motor. At synchronous speed this voltage is zero, and the voltage gradually increases as the speed varies either way from synchronous speed, being a maximum at standstill and relatively large at speeds considerably above synchronous.

Figure 6:
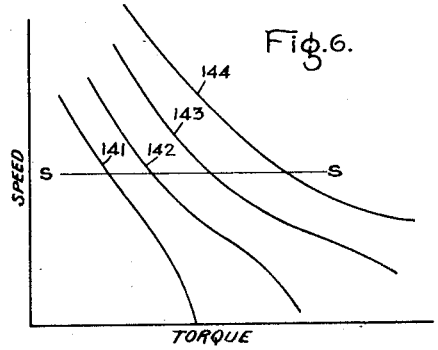

The speed torque curves of a repulsion motor of the type represented in Figs. 1, 2 and 3 are shown in Fig. 6 of the drawings. The curve indicated by reference numeral 144 is the speed torque curve of the motor when the movable brushes occupy the position 14ᶜ of Fig. 1, which is a high speed or normal running position of the movable brushes. Curves 143, 142 and 141 are the speed torque curves corresponding to the brush positions 14ᵇ, 14ᵃ and 14, respectively. It will be observed that in the brush position 14ᶜ the normal running speed is somewhat higher than synchronous speed, which is indicated by the horizontal line s—s. The starting torque for this brush position is very considerably greater than the normal running torque. On the other hand, in the low speed brush position 14 the speed is lower than synchronous speed for the same running torque. It will be seen that the speed torque curve 141 is of such a character that the starting torque is only slightly higher than the normal running torque for this corresponding brush position 14. It will thus be evident that in this low speed position of the brushes, the torque of the motor is relatively small, and hence if the static friction of the load to be driven is very high it may not be possible to start the load with the brushes in the low speed position, but instead it will be necessary to start with the brushes in the high speed position, and then after the motor is running up to speed to move the brushes back to the desired low speed position. One of the objects of my present invention is to overcome this difficulty, and to provide means whereby the speed torque characteristics of the motor can be controlled and modified to give a satisfactory starting torque when the brushes are shifted to the low speed positions.

In accordance with my present invention, an inductive winding or reactance is included in an auxiliary local circuit about the induced winding. The axis of this local circuit is electrically in quadrature to the axis of the principal short-circuit. The inductive winding has a magnetic circuit designed to become magnetically saturated at a predetermined voltage. This predetermined voltage is selected so as to limit the voltage between those points of the induced winding to which the inductive winding is electrically connected when the main brushes are in low speed positions to a value which is permissible from the point of view of voltage induced per commutator segment, and to a value which limits the choking effect of the torque-producing field. When the voltage between those points of the induced winding to which the inductive winding is electrically connected is such that the magnetic circuit of the inductive winding is magnetically saturated, the inductive winding will have a relatively low impedance, and a very large current will flow therethrough. The flow of this relatively large current through the inductive winding at low speeds decreases the torque-producing field of the motor and increases the energy current. The increase in energy current is considerably greater than the decrease in field strength, and, since torque is proportional to the product of the energy current into the field strength, an increased torque of the motor is effected. When the voltage between those points of the induced winding to which the inductive winding is electrically connected falls below the saturation voltage, for example as the motor speeds up after starting, the inductive winding acts as a choke coil of considerable impedance, and limits the flow of current therethrough to a relative small value. It will thus be evident that an inductive winding connected as described and having a predetermined saturation voltage determined in accordance with the principle of my invention is automatic in its action, and has no or very slight influence on the operation of the motor at normal running speeds, in the vicinity of synchronism, while at very low speeds and at very high speeds the effect of this inductive winding is very pronounced, due to the saturation of its magnetic circuit. A saturated inductive winding designed so as to limit the field strength at standstill and at relatively high speeds to a certain definite value will have this limiting effect only when the magnetic circuit of the winding is saturated, as at standstill or at relatively high speeds. The saturated inductive winding thus allows the motor field to increase in strength gradually as the motor speeds up. This automatic and gradual increase of field strength is exactly what is wanted during the starting of the motor in order to get the desired characteristics in commutation as well as relation between speed and torque.

In carrying out my invention in a motor of the type represented in Figs. 1, 2, and 3, I connect a reactive coil having a magnetic core designed to become magnetically saturated at a predetermined voltage value, between the two sets of short-circuited brushes 13—14. In Fig. 1 of the drawings I have illustrated such a reactive coil comprising a winding 16 connected between the short-circuiting conductors 15 and inductively interlinked with a magnetic circuit 17. The magnetic circuit 17 is so designed that it will become magnetically saturated when a predetermined voltage exists between the short-circuiting conductors 15, which voltage is so selected that saturation is attained at the starting of the motor, thus permitting a relatively large amount of current to flow through the winding 16. The current flowing in the inducing winding 10 induces by transformer action a current in the induced winding 12. The brush arrangement is such that the energy or working current of the motor flows through that portion of the induced winding included between the two relatively movable and short-circuited brushes of each set. The magnetization due to the current flowing in that portion of the inducing winding corresponding thereto is substantially neutralized by the magnetization produced by the energy or working current. The magnetization due to the current flowing in that portion of the inducing winding which corresponds to the portion of the induced winding between the two sets of short-circuited brushes is not neutralized by the currents flowing in the induced winding, and hence is effective to establish a field for the motor. It will thus be seen that the short-circuiting conductors 15 provide short-circuits for the induced winding along an axis at an angle to the magnetizing axis of the inducing winding, and that the inductive winding is connected in an auxiliary local circuit along an axis at right angles to the axis of the principal or main short-circuits. The inductive winding is thus connected along that axis of the induced winding which is interlinked with the torque producing field of the motor, and the effect of the inductive winding when so connected is to modify the torque producing field.

The strength of the torque producing field of the motors represented in Figs. 1, 2 and 3 of the drawings is determined by the angle embraced between a stationary brush 13 and the movable brush 14 of the adjacent short-circuited set of brushes, and hence when the movable brushes are shifted to a position near the stationary brushes of the adjacent short-circuited set of brushes, the torque producing field of the motor is relatively small, and when the movable brushes are shifted a relatively great distance from the stationary brushes of the adjacent short-circuited set of brushes, the torque producing field is relatively large. The latter positions of the movable brushes are their low speed positions and due to the large torque-producing field which exists when the brushes occupy such positions, the inducing winding will have considerable reactance, which chokes the flow of current therethrough, and results in diminishing the energy current of the motor. The local auxiliary circuit including the inductive winding connected between the sets of short-circuited brushes provides a current path for that portion of the induced winding which is interlinked with the torque producing field of the motor. A current thus flows in that portion of the induced winding interlinked with the torque producing field of the motor, and this current partially neutralizes the effect of the current flowing in that portion of the inducing winding interlinked with the motor field, whereby the motor field strength is decreased. The decrease in motor field strength reduces the reactance of the inducing winding and permits a larger current to flow therethrough, thereby increasing the energy current of the motor.

The voltage between the two sets of short-circuited brushes is a function of the angle embraced between the sets of short-circuited brushes and is further a function of the speed of the motor. At synchronous speed this voltage is zero, and the voltage gradually increases as the speed varies in either direction from synchronous speed, being a maximum at standstill, and relatively large at speeds considerably above synchronism. Since the voltage between the two sets of short-circuited brushes, and hence across that portion of the inducing winding which is effective in producing the motor field, is relatively large at standstill, the motor will have at standstill a very strong field. This strong field results in destructive sparking at the commutator brushes, and, due to the increased reactance of the inducing winding, tends to reduce the magnitude of the energy current in the motor. In accordance with the principle of my present invention, the magnetic circuit of the inductive winding is designed to become magnetically saturated at such a voltage value as to suitably limit the choking effect of the torque producing field and to restrict the voltage induced per commutator segment to a permissible value. When the voltage between the two sets of short-circuited brushes to which the inductive winding is connected is such that the magnetic circuit of the inductive winding is magnetically saturated, the inductive winding will have relatively low impedance, and a very large current will flow therethrough. The flow of this relatively large current through the inductive winding during the starting of the motor decreases the torque producing field of the motor and results in increasing the energy current. When the voltage between the two sets of short-circuited brushes falls below the saturation voltage, for example as the motor speeds up after starting, the inductive winding acts as a choke coil of considerable impedance, and limits the flow of current therethrough to a relatively small value. It will thus be evident that the effect of the saturated inductive winding in modifying the torque producing field of the motor is automatic, since the torque producing field is only materially modified when the magnetic circuit of the inductive winding is saturated, as at standstill or at relatively high speeds.

Figure 4:
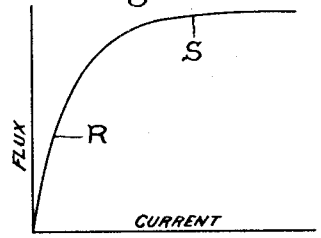

The magnetizing curve of the inductive winding 16 of Fig. 1 is shown in Fig. 4 of the drawings. During the starting of the motor the magnetic circuit 17 is worked at the point of saturation, for example in the vicinity of the point marked S, and the inductive winding therefore acts to provide a local current path about the induced winding of relatively low impedance. As the motor speeds up, the voltage between the points of the induced winding to which the inductive winding is electrically connected, that is across the two sets of short-circuited brushes, diminishes, and hence the current flowing in the local circuit including the inductive winding decreases, whereupon the magnetic circuit 17 is no longer saturated, and the inductive winding in this condition acts as a choke coil of relatively high impedance, so that at the normal running speeds of the motor little or no current flows in the inductive winding circuit. During the normal running of the motor the magnetic circuit 17 is worked in the vicinity of the point R.

Figure 7:
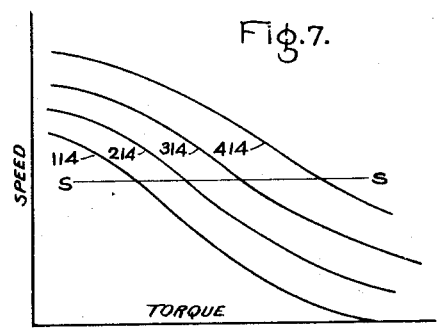

The effect of the inductive winding upon the speed torque curves of the motor is illustrated in Fig. 7. The curves 114, 214, 314 and 414 correspond to brush positions 14, 14$^a$, 14$^b$, and 14$^c$ and to curves 141, 142, 143 and 144 of Fig. 6. It will be evident upon examination of the curves of Fig. 7 that even in the low speed positions of the brushes the starting torque of the motor will be very much greater than the normal running torque for this brush position, and sufficiently large to start any load that a motor of this type is likely to be connected to. The saturated reactive coil is most beneficial for the low speed brush positions, and in these brush positions increases the torque range of the speed torque curve so that the motor has a relatively high starting torque, and a starting torque very considerably greater than obtained when the reactance is not employed. When the relatively movable brushes are shifted near together, which corresponds to the maximum full-speed of the motor, the inductive winding lies across a very small angle of the induced winding, and the voltage induced between the two sets of short-circuited brushes will not be high, even with a very high speed of the motor. For this reason the saturated inductive winding is most effective when the brushes are in the low speed positions, and it is with these positions of the brushes that my invention is more particularly concerned.

I may also improve the power factor of the motor by using for the inductive winding the secondary winding of a series transformer, the primary winding of which is connected in series with the inducing winding of the motor. This modification of my invention is illustrated in Fig. 2 of the drawings. In this figure I have illustrated a transformer having a primary winding 18 connected in series with the inducing winding 10 and a secondary winding 19 connected between the sets of short-circuited brushes. It will of course be understood that the transformer may take the form of a compensator in which case a single transformer winding will be employed, as is well understood in the art. The magnetic circuit 20 of the transformer is designed to become magnetically saturated by the starting current of the motor in exactly the same manner as heretofore explained in connection with Fig. 1. The phase of the electromotive force induced in the secondary winding 19 of the transformer and impressed on the two sets of short-circuited brushes is such that a power factor compensation is obtained as will be understood by those skilled in the art.

Figure 5:
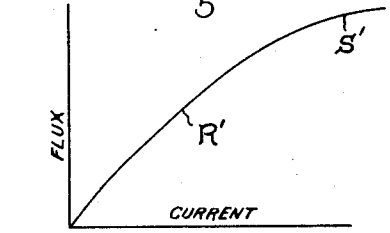

Another means for obtaining an improved power factor in connection with my invention is illustrated in Fig. 3 of the drawings. In the modification shown in this figure an inductive winding 21 is connected in series with a source of shunt excitation and across the two sets of short-circuited brushes. In this figure I have shown an arrangement whereby the desired shunt excitation is obtained from the inducing winding of the motor although of course it will be understood that a separate winding inductively related to the inducing winding or an independent source of electromotive force may be employed if desired. When the shunt excitation is supplied by the inducing winding the phase position will of course be suitably chosen to give a current of the proper time phase. In using the arrangement of Fig. 3, it is necessary to build the reactance with an open magnetic circuit 22 so that there will be a certain amount of shunt excitation at any speed, regardless of the voltage across the short-circuited brushes. The magnetizing curve of the magnetic circuit 22 is shown in Fig. 5. It will be noted that there is no sharp bend in this curve and saturation is gradually approached rather than abruptly, as in the cases of the inductive winding and the series transformer. The magnetic circuit is worked during the starting of the motor in the vicinity of the point S', while during the normal running of the motor the circuit is worked in the vicinity of the point R'.

In Fig. 8 of the drawings I have diagrammatically illustrated my invention applied to a slightly modified form of single phase alternating current commutator motor of the repulsion motor type. In this form of motor the brushes are arranged in quadrature and are all movable as a unit, being preferably carried by the same brush yoke. Thus, brushes 23—23 and brushes 24—24 correspond to brushes 13—13 and brushes 14—14, respectively, of the motors of Figs. 1, 2 and 3 of the drawings, and the principle of operation of the motor represented in Fig. 8 is substantially the same as that of the motor illustrated in the first three figures. A transformer winding 19 connected in series relation with the inducing winding 10 has its terminals connected across the two sets of short-circuited brushes just as in Fig. 2 of the drawings. It will be understood that the magnetic circuit of the transformer winding is designed to become magnetically saturated when the voltage between the brushes to which the transformer winding is connected attains a predetermined value.

Fig. 9 of the drawings diagrammatically illustrates my invention applied to a still different form of repulsion motor. This motor has a stator winding 10 and a commuted armature winding 12 of the same character as described in connection with the motors of Figs. 1, 2, 3 and 8. The brushes in the motor of Fig. 9 are arranged in electrical quadrature, and one set of oppositely positioned brushes 33—33 are directly short-circuited along an axis at an angle to the magnetizing axis of the inducing winding, while the other set of oppositely positioned brushes 34—34 are closed through the inductive winding 16 along an axis electrically in quadrature to the axis of the main short-circuit. The magnetic circuit 17 of this inductive winding 16 is designed to become magnetically saturated when the speed of the motor is such that a predetermined voltage exists between the brushes 34—34. All of the brushes in this form of motor are mounted upon the same brush yoke, and are hence movable as a unit to obtain the desired speed regulation of the motor.

In Fig. 10 of the drawings I have shown the inductive winding 16 of Fig. 9 of the drawings replaced by the secondary winding 19 of a series transformer, in order to obtain power factor compensation of the motor. The magnetic circuit of the transformer is designed to become magnetically saturated when a predetermined voltage exists between the brushes 34—34, and the function and operation of the transformer is the same as described in connection with Fig. 2. It will be evident that the main brushes 34—34 of the motors represented in Figs. 9 and 10 of the drawings provide a principal short-circuit for the induced winding along an axis at an angle to the magnetizing axis of the inducing winding, and that the auxiliary local circuit through the inductive winding, such as the winding 16 of the winding 19, is along an axis electrically at right angles to the axis of the principal short-circuit.

In Fig. 11 of the drawings I have shown in full lines, for the purpose of comparison, a speed torque curve of a character substantially general to single phase alternating current commutator motors of the type to which my invention relates, and in dotted lines a speed torque curve of such a motor embodying my invention. Synchronous speed is indicated by the horizontal line s—s. It will be noted that the application of my invention to such a motor modifies the speed torque curve of the motor at relatively low and at relatively high speeds. The voltage between the brushes to which the inductive winding of my invention is connected is substantially zero at synchronous speed. As the speed of the motor varies from synchronous speed in either direction the voltage between these brushes increases. Thus at relatively low speeds and at relatively high speeds, the voltage between these brushes is sufficiently large to cause the magnetic circuit of the inductive winding to become magnetically saturated, whereupon a relatively large current flows through the inductive winding. Thus at relatively low speeds my invention operates to increase the torque of the motor, while at relatively high speeds my invention operates to diminish the motor torque. That is, at relatively high speeds, or at light loads, my invention operates to limit the speed of the motor, and prevents the motor running away, where its normal characteristics are such that it has this tendency.

It will be evident from the foregoing description, that I have provided an arrangement of apparatus whereby the speed torque curve of a commutator motor of the repulsion motor type may be advantageously modified. Thus, in accordance with my invention the starting torque of the motor may be increased with reference to the running torque, and the light load speed of the motor may be suitably limited when desired. Incidentally, my present invention is also advantageous in preventing sparking at starting because the same amount of starting torque will be obtained with a large working current and small field strength.

Although the invention has been more particularly described with reference to a two pole motor with a revolving induced member, still it will be understood that the invention is equally well applicable to motors having any number of pole pairs, and that the induced instead of the inducing member may be stationary. I have explained my invention by diagrammatically illustrating and describing certain specific embodiments thereof, but it will be readily understood by those skilled in the art that the invention may be embodied in many other forms than that shown and described. I, accordingly, do not wish to be restricted to the particular form and construction disclosed herein by way of example for the purpose of setting forth my invention in accordance with the patent statutes. The terms of the appended claims, therefore, are not restricted to the precise structure disclosed, but are intended to cover all changes and modifications within the spirit and scope of my invention, and it will hence be understood that my invention may be embodied in practice in various other ways than that herein illustrated and described and still be within the purview of the claims appended hereto.

What I claim as new and desire to secure by Letters Patent of the United States, is:—

1. A single phase alternating current commutator motor having an inducing winding and an induced winding, a commutator connected to said induced winding, brushes bearing on said commutator, certain of said brushes being connected to form a main short-circuit about the induced winding along an axis at an angle to the magnetizing axis of the inducing winding, an inductive winding connected between certain of said brushes to form a local circuit about the induced winding along an axis in electrical quadrature to the axis of said main short-circuit, said inductive winding having a magnetic circuit designed to become magnetically saturated when a predetermined voltage exists between the brushes to which said inductive winding is connected.

2. A single phase alternating current commutator motor having an inducing winding and an induced winding, a commutator connected to said induced winding, brushes bearing on said commutator, certain of said brushes being connected to form a main short-circuit about the induced winding along an axis at an angle to the magnetizing axis of the inducing winding, a transformer having its primary winding connected in series with said inducing winding, the secondary winding of said transformer being connected between certain of said brushes to form a local circuit about the induced winding along an axis in electrical quadrature to the axis of said main short-circuit, said transformer having a magnetic circuit designed to become magnetically saturated when a predetermined voltage exists between the brushes to which the secondary winding is connected.

3. A single phase alternating current commutator motor having an inducing winding and an induced winding, a commutator connected to said induced winding, brushes bearing on said commutator, certain of said brushes being connected to form a locally short-circuited path for the current flowing in said induced winding, and an inductive winding connected between certain of said brushes and adapted to provide a local circuit about the induced winding along an axis which is interlinked with the torque producing field of the motor, said inductive winding having a magnetic circuit adapted to become magnetically saturated when a predetermined voltage exists between the brushes to which said inductive winding is connected.

4. A single phase alternating current commutator motor having an inducing winding and an induced winding, a commutator connected to said induced winding, brushes bearing on said commutator, certain of said brushes being connected to form a locally short-circuited path about the induced winding, and an inductive winding connected between certain of said brushes and having a magnetic circuit adapted to become magnetically saturated when a predetermined voltage exists between the brushes to which said inductive winding is connected.

5. A single phase alternating current commutator motor having an inducing winding and an induced winding, a commutator connected to said induced winding, brushes bearing on said commutator, certain of said brushes being connected to form a main short-circuit along one axis of said induced winding, and an inductive winding connected between certain of said brushes along an axis of said induced winding electrically in quadrature with the axis of the main short-circuit, said inductive winding having a magnetic circuit designed to become magnetically saturated when the speed of the motor is such that a predetermined voltage exists between the brushes to which said inductive winding is connected.

6. A single phase alternating current commutator motor having an inducing winding and an induced winding, a commutator connected to said induced winding, brushes bearing on said commutator, certain of said brushes being connected to form a main short-circuit along one axis of said induced winding, and a transformer winding connected in series relation with said inducing winding and between certain of said brushes along an axis of said induced winding electrically in quadrature with the axis of the main short-circuit, said transformer winding having a magnetic circuit designed to become magnetically saturated when the speed of the motor is such that a predetermined voltage exists between the brushes to which said inductive winding is connected.

7. A single phase alternating current commutator motor having an inducing winding and an induced winding, a commutator connected to said induced winding, brushes bearing on said commutator, certain of said brushes being connected to form a main short-circuit about the induced winding along an axis at an angle to the magnetizing axis of the inducing winding, an inductive winding connected between certain of said brushes to form a local circuit about the induced winding along an axis electrically in quadrature to the axis of said main short-circuit, said inductive winding having a magnetic circuit designed to become magnetically saturated when a predetermined voltage exists between the brushes to which said inductive winding is connected, and means whereby a power factor compensating electromotive force may be impressed upon said induced winding through the brushes to which said inductive winding is connected.

8. A single phase alternating current commutator motor having an inducing winding and an induced winding, a commutator connected to said induced winding, brushes bearing on said commutator, certain of said brushes being connected to form a locally short-circuited path for the current flowing in said induced winding, and a transformer winding connected in series relation with said inducing winding and between certain of said brushes and having a magnetic circuit adapted to become magnetically saturated when a predetermined voltage exists between the brushes to which said inductive winding is connected.

9. A single phase alternating current commutator motor having an inducing winding and an induced winding, a commutator connected to said induced winding, brushes bearing on said commutator, certain of said brushes being connected to form a locally short-circuited path for the current flowing in said induced winding, an inductive winding connected between certain of said brushes and having a magnetic circuit adapted to become magnetically saturated when a predetermined voltage exists between the brushes to which said inductive winding is connected, and means whereby a power factor compensating electromotive force may be impressed upon said induced winding through the brushes to which said inductive winding is connected.

In witness whereof, I have hereunto set my hand this 10th day of September, 1914.

ERNST F. W. ALEXANDERSON.

Witnesses:
BENJAMIN B. HULL,
HELEN ORFORD.

Copies of this patent may be obtained for five cents each, by addressing the "Commissioner of Patents, Washington, D. C."